United States Patent
Schwefer et al.

(10) Patent No.: US 7,462,340 B2
(45) Date of Patent: Dec. 9, 2008

(54) METHOD AND DEVICE FOR REDUCING THE $NO_X$ AND $N_2O$ OF GASES

(75) Inventors: Meinhard Schwefer, Meschede (DE); Michael Groves, Gevelsberg (DE); Rolf Siefert, Rheda-Wiedenbruck (DE); Rainer Maurer, Schwelm (DE)

(73) Assignee: Unde GmbH (DE)

( * ) Notice: Subject to any disclaimer, the term of this patent is extended or adjusted under 35 U.S.C. 154(b) by 306 days.

(21) Appl. No.: 10/516,918

(22) PCT Filed: Jun. 10, 2003

(86) PCT No.: PCT/EP03/06051

§ 371 (c)(1),
(2), (4) Date: Jul. 8, 2005

(87) PCT Pub. No.: WO03/105998

PCT Pub. Date: Dec. 24, 2003

(65) Prior Publication Data
US 2006/0051277 A1   Mar. 9, 2006

(30) Foreign Application Priority Data
Jun. 13, 2002   (DE)   ................ 102 26 461

(51) Int. Cl.
*B01D 53/56*   (2006.01)
*B01D 53/74*   (2006.01)
*B01D 53/75*   (2006.01)
*B01D 53/76*   (2006.01)

(52) U.S. Cl. .................. 423/239.1; 423/239.2; 422/168; 422/169; 422/170; 422/171; 422/172; 422/177; 422/180; 422/181

(58) Field of Classification Search .............. 423/239.1, 423/239.2; 422/168, 169, 170, 171, 172, 422/177, 180, 181
See application file for complete search history.

(56) References Cited

U.S. PATENT DOCUMENTS

| | | | |
|---|---|---|---|
| 2,475,855 | A | 7/1949 | Peters |
| 3,733,181 | A | 5/1973 | Tourtellotte et al. |
| 4,372,920 | A | 2/1983 | Zardi |
| 4,571,329 | A | 2/1986 | Kato et al. |
| 5,053,210 | A | 10/1991 | Buxel et al. |
| 5,171,553 | A | 12/1992 | Li et al. |
| 5,451,387 | A | 9/1995 | Farnos et al. |
| 5,516,497 | A | 5/1996 | Speronello et al. |

(Continued)

FOREIGN PATENT DOCUMENTS

DE   198 28 777   12/1999

(Continued)

*Primary Examiner*—Timothy C Vanoy
(74) *Attorney, Agent, or Firm*—Connolly Bove Lodge & Hutz LLP

(57) ABSTRACT

The disclosure involves a method for reducing the content of $NO_x$ and $N_2O$ in gases. The method includes the conduction of a gas containing $N_2O$ and $NO_X$ over a series of two catalyst beds containing of one or more zeolites charged with iron followed by the: addition of a reduction agent for $NO_X$ between the catalyst beds. The first catalyst bed reaction zone is used to degrade the $N_2O$ and the catalyst bed second reaction zone reduces the $NO_X$ and breaks down at least part of the remaining $N_2O$. The inventive device comprises at least one radially traversed catalyst bed.

22 Claims, 6 Drawing Sheets

U.S. PATENT DOCUMENTS

| | | |
|---|---|---|
| 7,238,641 B2 * | 7/2007 | Hamon et al. ............... 502/330 |
| 2002/0039550 A1 * | 4/2002 | Schafer-Sindlinger et al. .................. 423/239.2 |
| 2002/0044902 A1 | 4/2002 | Delahay et al. |
| 2003/0143141 A1 * | 7/2003 | Schwefer et al. ............ 423/235 |
| 2003/0143142 A1 | 7/2003 | Schwefer et al. |

FOREIGN PATENT DOCUMENTS

| | | |
|---|---|---|
| DE | 100 01 539 | 8/2001 |
| EP | 0 955 080 | 11/1999 |
| EP | 0 967 006 | 12/1999 |
| EP | 1 022 056 | 7/2000 |
| JP | 7-60126 | 3/1995 |
| WO | WO-00/48715 | 8/2000 |
| WO | WO-01/51181 | 7/2001 |
| WO | WO-01/51182 | 7/2001 |
| WO | WO-02/068098 | 9/2002 |

* cited by examiner

METHOD AND DEVICE FOR REDUCING THE $NO_x$ AND $N_2O$ OF GASES

CROSS-REFERENCE TO RELATED APPLICATIONS

This application is a national stage application (under 35 U.S.C. 371) of PCT/EP03/06051 filed Jun. 10, 2003 which claims benefit to German application Serial No. 102 26 461.9 filed Jun. 13, 2002.

The present invention relates to a process for reducing the content of nitrogen oxides in gases, in particular in process gases and offgases, and also an apparatus suitable for carrying out this process.

Many processes, e.g. combustion processes or in the industrial preparation of nitric acid, produce an off-gas laden with nitrogen monoxide NO, nitrogen dioxide $NO_2$ (together referred to as $NO_x$) and nitrous oxide $N_2O$. While NO and $NO_2$ have long been known as compounds having ecotoxic relevance (acid rain, smog formation) and limit values for maximum permissible emissions of these have been set worldwide, nitrous oxide has increasingly moved into the focus of environmental protection in recent years, since it contributes to a not inconsiderable extent to the degradation of stratospheric ozone and to the greenhouse effect. For reasons of environmental protection, there is an urgent need for technical solutions which enable nitrous oxide emissions to be eliminated together with the $NO_x$ emissions.

Numerous possible ways of separately removing firstly $N_2O$ and secondly [lacuna] are known.

In the case of $NO_x$ reduction, particular mention may be made of the selective catalytic reduction (SCR) of $NO_x$ by means of ammonia in the presence of vanadium-containing $TiO_2$ catalysts (cf., for example, G. Ertl, H. Knözinger J. Weitkamp: Handbook of Heterogeneous Catalysis, Vol. 4, pages 1633-1668, VCH Weinheim (1997)). This can, depending on the catalyst, proceed at temperatures of from about 150° C. to about 450° C. and makes it possible to decrease the concentration of $NO_x$ by more than 90%. it is the most widely utilized variant of the removal of $NO_x$ from offgases from industrial processes.

Processes for the reduction of $NO_x$ which are based on zeolite catalysts and proceed using a variety of reducing agents are also known. Apart from Cu-exchanged zeolites (cf., for example, EP-A-0914866), iron-containing zeolites in particular appear to be of interest for practical use.

Thus, U.S. Pat. No. 4,571,329 claims a process for reducing $NO_x$ in a gas comprising at least 50% of $NO_2$ by means of ammonia in the presence of an Fe zeolite. The ratio of $NH_3$ to $NO_2$ is at least 1.3. According to the process described in this patent, $NO_x$-containing gases are said to be reduced by means of ammonia without formation of $N_2O$ as by-product occurring.

U.S. Pat. No. 5,451,387 describes a process for the selective catalytic reduction of $NO_x$ by means of $NH_3$ over iron-exchanged zeolites at temperatures of about 400° C.

In contrast to the removal of $NO_x$ from offgases, which has been established industrially for many years, there are only few industrial processes for eliminating $N_2O$. These are usually based on thermal or catalytic degradation of the $N_2O$. An overview of catalysts whose in-principle suitability for the degradation and removal of nitrous oxide has been demonstrated, is given by Kapteijn et al. (Kapteijn F. et al., Appl. Cat. B: Environmental 9 (1966) 25-64).

Fe and Cu zeolite catalysts which either effect a pure decomposition of the $N_2O$ into $N_2$ and $O_2$ (U.S. Pat. No. 5,171,553) or catalytically reduce the $N_2O$ with the aid of $NH_3$ or hydrocarbons to $N_2$ and $H_2O$ or $CO_2$ appear to be particularly useful.

Thus, JP-A-07 060 126 describes a process for reducing $N_2O$ by means of $NH_3$ in the presence of iron-containing zeolites of the pentasil type at temperatures of 450° C. The reduction in the $N_2O$ concentration which can be achieved by means of this process is 71%.

In Catal. Lett. 62 (1999) 41-44, Mauvezin et al. give an overview of the suitability of various, iron-exchanged zeolites of the MOR, MFI, BEA, FER, FAU, MAZ and OFF types for this purpose. According to this reference, reduction of more than 90% of the $N_2O$ can be achieved by addition of $NH_3$ at below 500° C. only in the case of Fe-BEA.

Apart from the abovementioned processes for the separate removal of $N_2O$ and $NO_x$, there are also processes for combined removal which can be carried out using a single catalyst.

WO-A-00/48715 discloses a process in which an $NO_x$- and $N_2O$-containing offgas is passed at temperatures of from 200 to 600° C. over an iron zeolite catalyst of the beta type (=BEA type), with the offgas additionally containing $NH_3$ in a ratio of from 0.7 to 1.4 based on the total amount of $NO_x$ and $N_2O$. Here, $NH_3$ serves as reducing agent both for $NO_x$ and for $N_2O$. Although the process operates at temperatures of less than 500° C., it suffers, like the abovementioned process, from the in-principle disadvantage that an approximately equimolar amount of reducing agent (here $NH_3$) is required to eliminate the $N_2O$ content.

WO-A-01/51,181 discloses a process for the removal of $NO_x$ and $N_2O$, in which a process gas or offgas is passed through two reaction zones containing iron-laden zeolites as catalysts. In the first reaction zone, $N_2O$ is removed, ammonia is added to the gas mixture between the first and second reaction zones and $NO_x$ is reduced in the second reduction zone.

It has now surprisingly been found that the effectiveness of the abovementioned process can be increased significantly when the reduction in the $N_2O$ content to the desired degree of removal occurs not solely in the first reaction zone, but instead the reaction zone for the $NO_x$ reduction can also be utilized for reducing the $N_2O$ content. This has become possible since it has surprisingly been established that simultaneous $NO_x$ reduction (e.g. by means of $NH_3$) and $N_2O$ decomposition is possible when using iron-laden zeolite catalysts. The contribution of the second reaction step to the decomposition of $N_2O$ is particularly great when the process is operated at elevated pressures, i.e. at pressures above 2 bar, preferably above 4 bar.

It is an object of the present invention to provide a simple but economical process which gives good conversions both for $NO_x$ removal and for $N_2O$ removal and has minimal operating and capital costs. The former includes not only the energy for setting the necessary operating temperature but also the consumption of reducing agent and energy losses due to resistances to flow in the catalyst bed (pressure drops). The capital costs are determined essentially by the required amounts of catalyst and the apparatus volumes associated therewith.

In addition, there is the problem of introducing the reducing agent which has to be mixed intimately with the gas stream to be treated in order to ensure a very high efficiency of the reducing agent (avoidance of secondary reactions and passage without reaction). The mixer necessary for this purpose should take up as little space as possible because of installation and economic considerations.

These objects are achieved by the process of the invention and the apparatus of the invention

Figure 1:
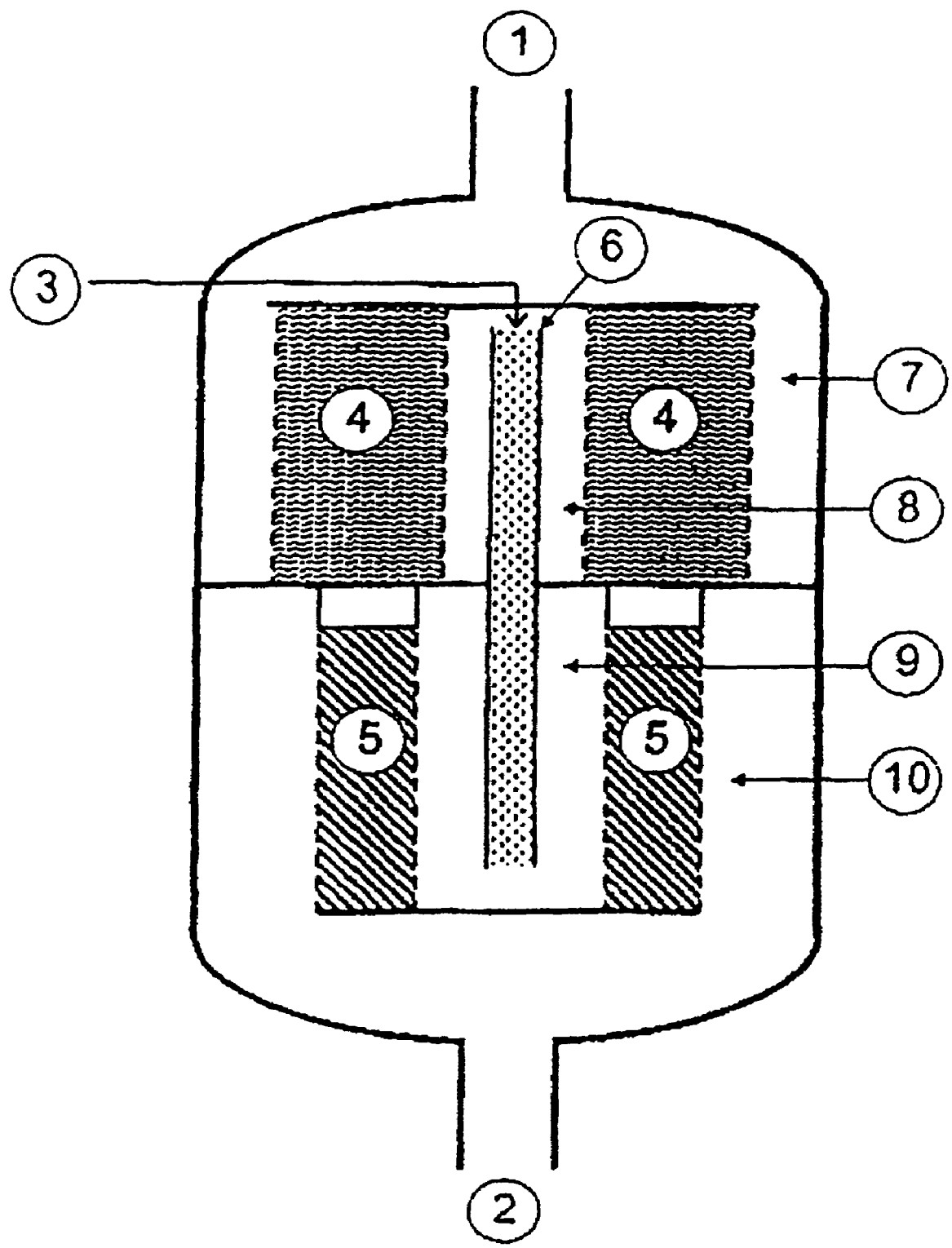
FIG. 1 depicts an apparatus with gas inlet (1) and gas outlet (2) and the arrangement of the catalyst beds.

The invention provides a process for reducing the content of $NO_x$ and $N_2O$ in gases, in particular in process gases and offgases, which comprises the measures:

a) passing the $N_2O$— and $NO_x$-containing gas over a sequence of two catalyst beds comprising one or more iron-laden zeolites, b) adding a reducing agent for $NO_x$ between the catalyst beds, c) setting a temperature of less than 500° C. in the first catalyst bed and second catalyst bed, d) setting a gas pressure of at least 2 bar in the two catalyst beds, e) selecting a space velocity in the first and second catalyst beds such that a reduction in the $N_2O$ content of the gas by not more than 90%, based on the $N_2O$ content at the entrance to the first catalyst bed, occurs in the first catalyst bed and that a further reduction in the $N_2O$ content of the gas by at least 30%, based on the $N_2O$ content at the entrance to the second catalyst bed, occurs in the second catalyst bed.

In the first catalyst bed for pure $N_2O$ decomposition, the $NO_x$ which is still present in the gas accelerates, as expected, the desired $N_2O$ decomposition by means of an activating action as has been described for various $N_2O/NO_x$ ratios by Kögel et al. in Catal. Comm. 2 (2001) 273-6.

However, an appreciable decrease in the $N_2O$ concentration by decomposition into nitrogen and oxygen can be achieved in the second catalyst bed, too. This was surprising since, firstly, the $NO_x$ content which activates the $N_2O$ decomposition is reduced by addition of the reducing agent and, secondly, it was expected that the reducing agent added would be temporarily adsorbed on the catalyst surface and thus block the active sites for $N_2O$ decomposition.

Under the chosen process conditions, i.e. the elevated pressures and in particular a reduced $NH_3/NO_x$ ratio, these influences obviously do not come to bear.

The process of the invention thus makes it possible to carry out both the decomposition of $N_2O$ and the reduction of $NO_x$ at a low operating temperature and economical space velocities and at the same time achieve high degrees of removal of $N_2O$ and $NO_x$.

For the purposes of the present invention, the space velocity is the volume of gas mixture (measured at 0° C. and 1.014 bara) per hour divided by the volume of catalyst. The space velocity can thus be set via the volume flow of the gas and/or via the amount of catalyst.

The gas laden with nitrogen oxides is usually passed over the catalyst at a space velocity of from 200 to 200,000 $h^{-1}$, preferably from 5,000 to 100,000 $h^{-1}$, in particular from 5,000 to 50,000 $h^{-1}$, based on the total catalyst volume of the two catalyst beds.

After leaving the first catalyst bed, the $N_2O$ content is, according to the process of the invention, preferably above 200 ppm, in particular above 300 ppm. A reduction of not more than 90%, preferably not more than 80%, in the $N_2O$ content present at the beginning of the first catalyst bed occurs in the first catalyst bed.

After leaving the first catalyst bed, the $N_2O$— and $NO_x$— containing gas is firstly mixed with a gaseous reducing agent, preferably with $NH_3$, and subsequently passed over the catalyst at a temperature of preferably less than 450° C. and at the chosen space velocity to achieve simultaneous removal of $N_2O$ (by decomposition) and $NO_x$ (by reduction).

In the second catalyst bed, an additional reduction of at least 30%, preferably at least 40%, in the $N_2O$ content present at the beginning of the second catalyst bed occurs.

In the process of the invention, iron-containing zeolites are used in the first and second catalyst beds. The catalysts used in the respective catalyst beds can be different or can preferably be the same catalyst.

Physical separation of the catalyst beds makes it possible to set the temperature of the second catalyst bed or of the gas stream entering it by removal or introduction of heat so that it is lower or higher than that of the first catalyst bed.

The temperature of the gas stream in the first catalyst bed in which only the $N_2O$ is removed and also in the second catalyst bed in which $N_2O$ and $NO_x$ are removed is, according to the invention, below 500° C., preferably in the range from 250 to 500° C., in particular from 300 to 450° C. and very particularly preferably from 350 to 450° C. The temperature in the second catalyst bed preferably corresponds to the temperature in the first catalyst bed. The temperature in the catalyst bed can advantageously be determined as the arithmetic mean of the temperature of the gas stream at the entrance to and exit from the catalyst bed.

The choice of operating temperature is, like the space velocity selected, determined by the desired degree of removal of $N_2O$.

The temperature, volume flow and amount of catalyst in the first catalyst bed are preferably selected so that not more than 90%, preferably not more than 80% and very particularly preferably not more than 70%, of the $N_2O$ present at the beginning of the first catalyst bed is decomposed in the first catalyst bed.

The temperature, volume flow and amount of catalyst in the second catalyst bed are preferably selected so that a further reduction in the $N_2O$ content of the gas by at least 30%, based on the $N_2O$ content at the entrance to the second catalyst bed, occurs in the second catalyst bed.

The process of the invention is carried out at an elevated pressure of at least 2 bar, preferably at least 3 bar, very particularly preferably from 4 to 25 bar. The introduction of the reducing agent between the first catalyst bed and the second catalyst bed, i.e. downstream of the first and upstream of the second catalyst bed, is carried out by means of a suitable device, e.g. an appropriate pressure valve or appropriately configured nozzles.

In the first reaction zone, a relatively low water concentration is generally preferred, since a very high water content would make high operating temperatures (e.g. >500° C.) necessary. Depending on the type of zeolite used and the time of operation, this could exceed the hydrothermal stability limits of the catalyst. However, the $NO_x$ content plays a critical role here, since this can stop deactivation by water.

In the case of the $NO_x$ reduction in the second reaction zone, a high water content plays a minor role, since high degrees of removal of $NO_x$ are achieved here even at relatively low temperatures.

The reducing agent is used in the amount required for reduction of the $NO_x$. For the purposes of the present description, this is that amount of reducing agent which is necessary to reduce the $NO_x$ present in the gas mixture either completely or to the desired final concentration without appreciable reduction of $N_2O$ taking place.

As reducing agents for the purposes of the invention, it is possible to use substances which have a high activity and selectivity for the reduction of $N_2O$ and whose selectivity and activity under the reaction conditions selected is greater than that for the possible reduction of $N_2O$.

Reducing agents which can be used for the purposes of the invention are, for example, hydrocarbons, hydrogen, carbon monoxide, ammonia or mixtures thereof, e.g. synthesis gas. Particular preference is given to ammonia or substances which liberate ammonia when they are introduced, e.g. urea or ammonium carbamate.

The amount of reducing agent added must not be appreciably greater than that required for the reduction of $NO_x$ under the reaction conditions selected.

In the case of ammonia as reducing agent, use is made, depending on the desired degree to which the $NO_x$ content is to be decreased, of up to a maximum of 1.2, preferably from 1.0 to 1.2, mol of ammonia per mol of $NO_x$. If a relatively low degree of removal of $NO_x$ is desired, the maximum amount of ammonia is 1.2*y mol per mol of $NO_x$; y is the percentage of $NO_x$ which is to be consumed in the reduction.

When suitable catalysts and process conditions are chosen, the $NH_3$ added does not act as reducing agent for $N_2O$ but instead selectively reduces the $NO_x$ present in the offgas.

The process of the invention thus makes it possible to carry out the removal of $N_2O$ and of $NO_x$ at a lower operating temperature with a small consumption of gaseous reducing agent, e.g. $NH_3$, which has hitherto not been possible by means of the processes described in the prior art.

This is a particularly great advantage when large amounts of $N_2O$ are to be eliminated.

The way in which the gaseous reducing agent is introduced into the gas stream to be treated can be chosen freely for the purposes of the invention as long as the introduction is upstream of the second catalyst bed. The reducing agent can be introduced, for example, in the inlet line upstream of the container for the second catalyst bed or immediately before the catalyst bed. The reducing agent can be introduced in the form of a gas or else a liquid or aqueous solution which vaporizes in the gas stream to be treated.

Catalysts used according to the invention substantially comprise one or more iron-laden zeolites, preferably in an amount of >50% by weight, in particular >70% by weight. Thus, for example, not only an Fe-ZSM-5 zeolite but also a further iron-containing zeolite, e.g. an iron-containing zeolite of the MFI or FER type, can be present in the catalyst used according to the invention. In addition, the catalyst used according to the invention can further comprise other additives known to those skilled in the art, e.g. binders.

Catalysts used according to the invention are preferably based on zeolites into which iron has been introduced by solid-state ion exchange. The commercially available ammonium zeolites (e.g. $NH_4$-ZSM-5) and appropriate iron salts (e.g. $FeSO_4 \times 7\ H_2O$) are usually used as starting materials for this purpose and are intensively mixed with one another by mechanical means in a ball mill at room temperature. (Turek et al.; Appl. Catal. 184, (1999) 249-256; EP-A-0 955 080). The references are hereby expressly incorporated by reference. The catalyst powders obtained are subsequently calcined in air at temperatures in the range from 400 to 600° C. in a muffle furnace. After calcination, the iron-containing zeolites are intensively washed in distilled water, filtered off and dried. The iron-containing zeolites obtained in this way are subsequently admixed with suitable binders and mixed and, for example, extruded to form cylindrical catalyst bodies. Suitable binders include all binders customarily used; the most widely used here are aluminum silicates such as kaolin.

According to the present invention, the zeolites which can be used are laden with iron. The iron content can be up to 25%, but is preferably from 0.1 to 10%, based on the mass of zeolite.

Iron-laden zeolites are preferably of the MFI, BEA, FER, MOR, FAU and/or MEL type, in particular of the ZSM-5 type.

In a preferred embodiment, iron-laden zeolites whose crystal structure has no pores or channels having crystallographic diameters greater than or equal to 7.0 Angstrom are used at least in the second catalyst bed.

These include iron-laden zeolites of the MFI, FER and/or MEL type, in particular of the ZSM-5 type.

The process of the invention can also be carried out using zeolites in which part of the lattice aluminum has been isomorphously replaced by one or more elements, for example by one or more elements selected from among B, Be, Ga, Fe, Cr, V, As, Sb and Bi. The use of zeolites in which the lattice silicon is isomorphously replaced by one or more elements, for example by one or more elements selected from among Ge, Ti, Zr and Hf, is likewise included.

Precise details on the configuration or structure of the zeolites used according to the invention are given in the Atlas of Zeolite Structure Types, Elsevier, 4th revised edition 1996, which is hereby expressly incorporated by reference.

In the process of the invention, very particular preference is given to using the above-defined zeolite catalysts which have been treated with water vapor (steamed catalysts). Such treatment removes aluminum from the lattice of the zeolite, and is known per se to those skilled in the art. These hydrothermally treated zeolite catalysts surprisingly display a particularly high activity in the process of the invention.

Preference is given to using hydrothermally treated zeolite catalysts which have been laden with iron and in which the ratio of extralattice aluminum to lattice aluminum is at least 1:2, preferably from 1:2 to 20:1.

The water content of the reaction gas is preferably in the range <25% by volume, in particular in the range <15% by volume. A low water content is generally to be preferred.

In general, a relatively low water concentration is preferred, since relatively high water contents would make relatively high operating temperatures. This could, depending on the type of zeolite used and the operating time, exceed the hydrothermal stability limits of the catalyst and is thus to be matched to the particular case chosen.

The presence of $CO_2$ and of other deactivating constituents of the reaction gas which are known to those skilled in the art should also be minimized if possible, since they would have an adverse effect on the $N_2O$ removal.

The process of the invention also works in the presence of $O_2$, since the catalysts used according to the invention have appropriate selectivities which suppress reaction of the gaseous reducing agent, e.g. $NH_3$, with $O_2$ at temperatures of <500° C.

All these influencing factors and also the chosen throughput over the catalyst, i.e. the space velocity, are to be taken into account in choosing the appropriate operating temperature of the reaction zone.

The process of the invention can be used in particular in nitric acid production, for offgases from power stations or for gas turbines. Process gases and offgases which contain nitrogen oxides and from which the nitrogen oxides can be removed inexpensively by means of the process disclosed here are obtained in these processes. The process of the invention is advantageously used for the tailgas from nitric acid production downstream of the absorption tower.

The configuration of the catalyst beds can be chosen freely for the purposes of the invention. Thus, for example, the catalyst or catalysts can be arranged in a catalyst bed through which the gas flows axially or preferably radially in one or more containers.

The invention further provides an apparatus for reducing the content of $NO_x$ and $N_2O$ in gases, in particular in process gases and offgases, which comprises:

A) two catalyst beds which are connected in series and each comprise one or more iron-laden zeolites and through which the $NO_x$— and $N_2O$— containing gas flows, B) a device for introducing a gaseous reducing agent into the stream of the $NO_x$— and $N_2O$— containing gas located between the catalyst beds, wherein C) the $NO_x$— and $N_2O$-containing gas flows radially through at least one of the catalyst beds.

In a preferred embodiment, both catalyst beds are arranged in one container which considerably reduces the apparatus costs.

According to the invention, the gas to be purified flows radially through at least one catalyst bed, preferably both catalyst beds, which results in a considerably reduced pressure drop.

The catalyst beds through which the gas flows radially are, for example, configured in the form of hollow cylinders but can also have other shapes. The catalyst beds through which the gas flows radially can be arranged-above one another or a combination of catalyst beds through which axial and radial flow occurs can be chosen. The path of the gas is prescribed by suitably arranged separators between the catalyst beds so that the gas flows firstly through the first catalyst bed and then through the second catalyst bed.

In the case of catalyst beds through which the gas flows radially, these can also be in the form of hollow cylinders arranged concentrically within one another. In this embodiment too, it should be ensured that the path of the gas is prescribed by suitably arranged separators between the catalyst beds so that the gas flows firstly through the first catalyst bed and then through the second catalyst bed.

The flow direction of the gas in the radial screen reactor can be from the inside outward or from the outside inward.

In a preferred embodiment, there are two catalyst beds through which the gas flows radially, for example in the form of two hollow cylinders, having different dimensions, with the external dimension of one catalyst bed being smaller than the internal dimension of the other catalyst bed and both catalyst beds being arranged concentrically, and with the path of the gas being prescribed by suitably arranged separators between the catalyst beds so that the gas flows firstly through the first catalyst bed and then through the second catalyst bed.

In a further preferred embodiment of the apparatus of the invention, the gas which has passed through the first catalyst bed is passed into a mixer which is preferably located in the center of the apparatus and a feed line for reducing agent which opens into the space downstream of the first catalyst bed and before or preferably into the mixer is provided, with the gas to be purified being passed through the second catalyst bed after leaving the mixer.

The mixer serves to distribute the reducing agent intimately in the gas stream. For the purposes of the invention, the mixer can be configured freely, for example as a static mixer with appropriate internals or as a dynamic mixer. The simplest form of a tube through which flow is preferably turbulent is also possible as a mixer for the purposes of the invention.

FIGS. 1 to 6 show preferred embodiments of the apparatus of the invention in longitudinal section.

FIG. 1 depicts an apparatus according to the invention with gas inlet (1) and gas outlet (2). In the upper interior space closest to the gas inlet (1), the first catalyst bed is arranged in the form of a hollow cylinder (4) and is located on a dividing wail which divides the interior of the apparatus into two halves. In addition, the upper end face of the hollow cylinder (4) is closed by a dividing wall. The gas to be purified flows through the gas inlet (1) and, via the annular gap of the entrance (7) to the first catalyst bed, flows radially through the first catalyst bed into the annular gap of the exit (8) from the first catalyst bed. From there it flows into the mixer (6) at whose inlet end there is the opening of an inlet line (3) for the reducing agent. Mixer (6) passes through the dividing wall and the gas then flows, via the annular gap of the entrance (9) to the second catalyst bed (5) located beneath the first catalyst bed (4), radially through the second catalyst bed into the annular gap of the exit (10) from the second catalyst bed (5). From there, the purified gas leaves the apparatus via the gas outlet (2).

Figure 2:
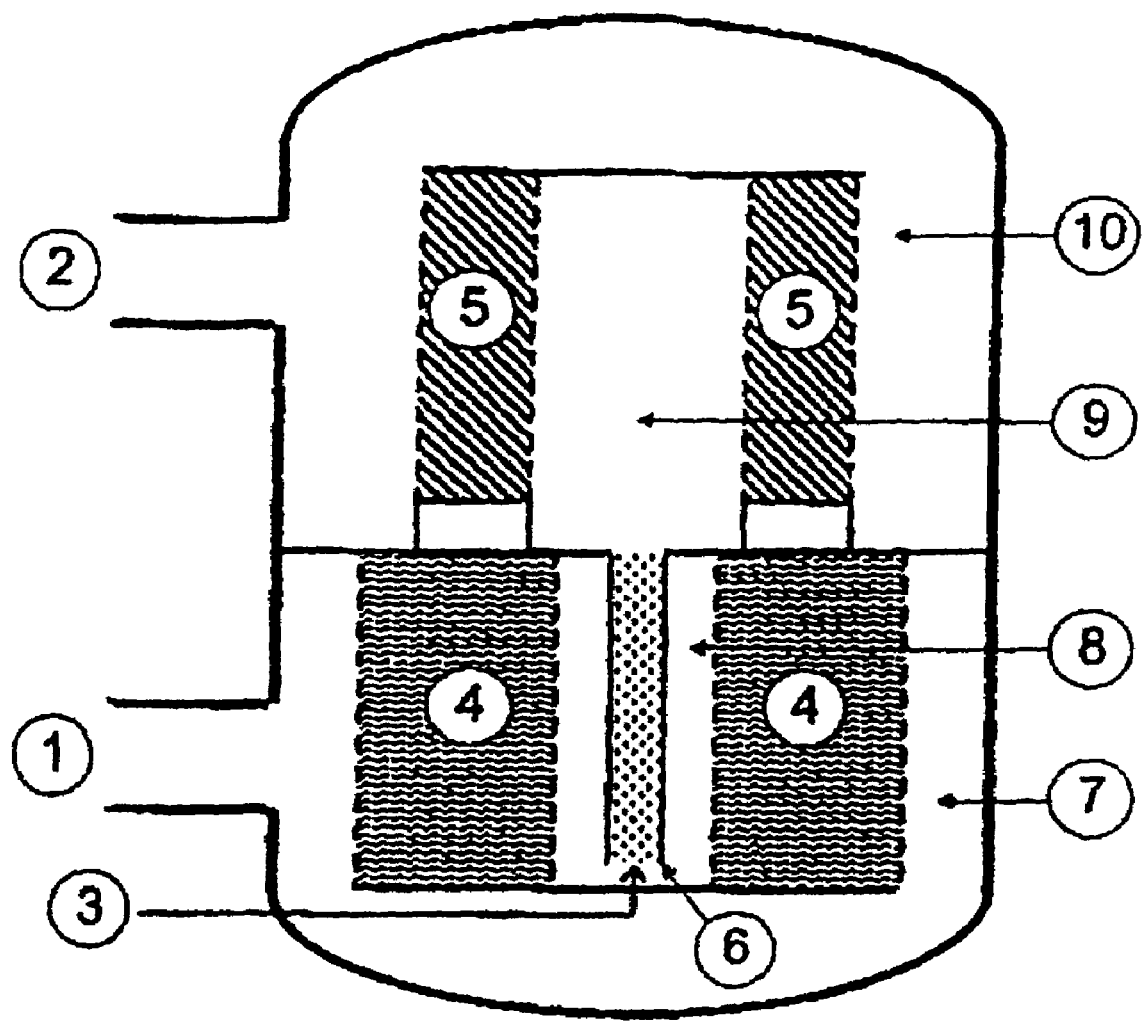
FIG. 2 depicts an apparatus with gas inlet (1) and gas outlet (2) arranged laterally in the apparatus and the arrangement of the catalyst beds.

FIG. 2 shows a similar embodiment as FIG. 1 with the differences that the first catalyst bed (4) is located underneath the second catalyst bed (5) and that gas inlet (1) and gas outlet (2) are arranged laterally in the apparatus. The other references numerals have the meanings given in the description of FIG. 1.

Figure 3:
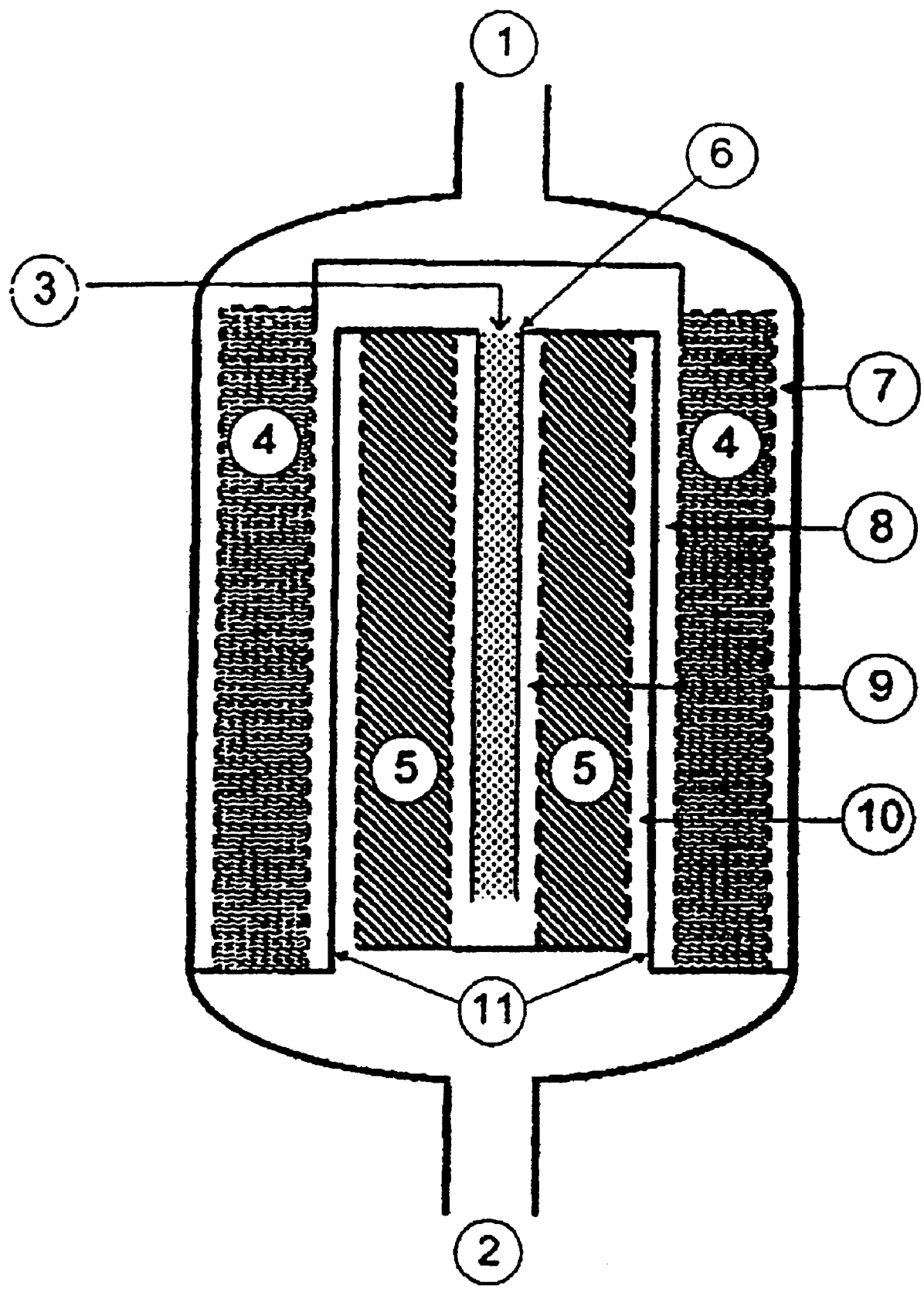
FIG. 3 depicts an embodiment of the apparatus with gas inlet (1) and gas outlet (2) and the catalyst beds configured as two hollow cylinders arranged concentrically within one another.

FIG. 3 depicts a further embodiment of the apparatus of the invention with gas inlet (1) and gas outlet (2). Here, the first catalyst bed (4) and the second catalyst bed (5) are configured as two hollow cylinders arranged concentrically within one another. The first catalyst bed (4) is located outside a concentric dividing wall (11) which closes off the lower end face of the catalyst bed (4), the annular gaps (7) and (8) and also the interior of the apparatus and the upper end face of the second catalyst bed (5). The gas to be purified enters the apparatus through the gas inlet (1) and flows radially through the first catalyst bed from the outer annular gap entrance (7) inward to the annular gap exit (8). From there it flows into the mixer (6) at whose inlet end there is the opening of an inlet line (3) for the reducing agent. The mixer (6) opens into the interior of the second catalyst bed (5) which is closed off at the bottom by a dividing wall. The gas then flows, via the annular gap of the entrance (9) to the second catalyst bed (5), radially outward through the second catalyst bed into the annular gap of the exit (10) from the second catalyst bed (5). From there the purified gas leaves the apparatus via the gas outlet (2).

Figure 4:
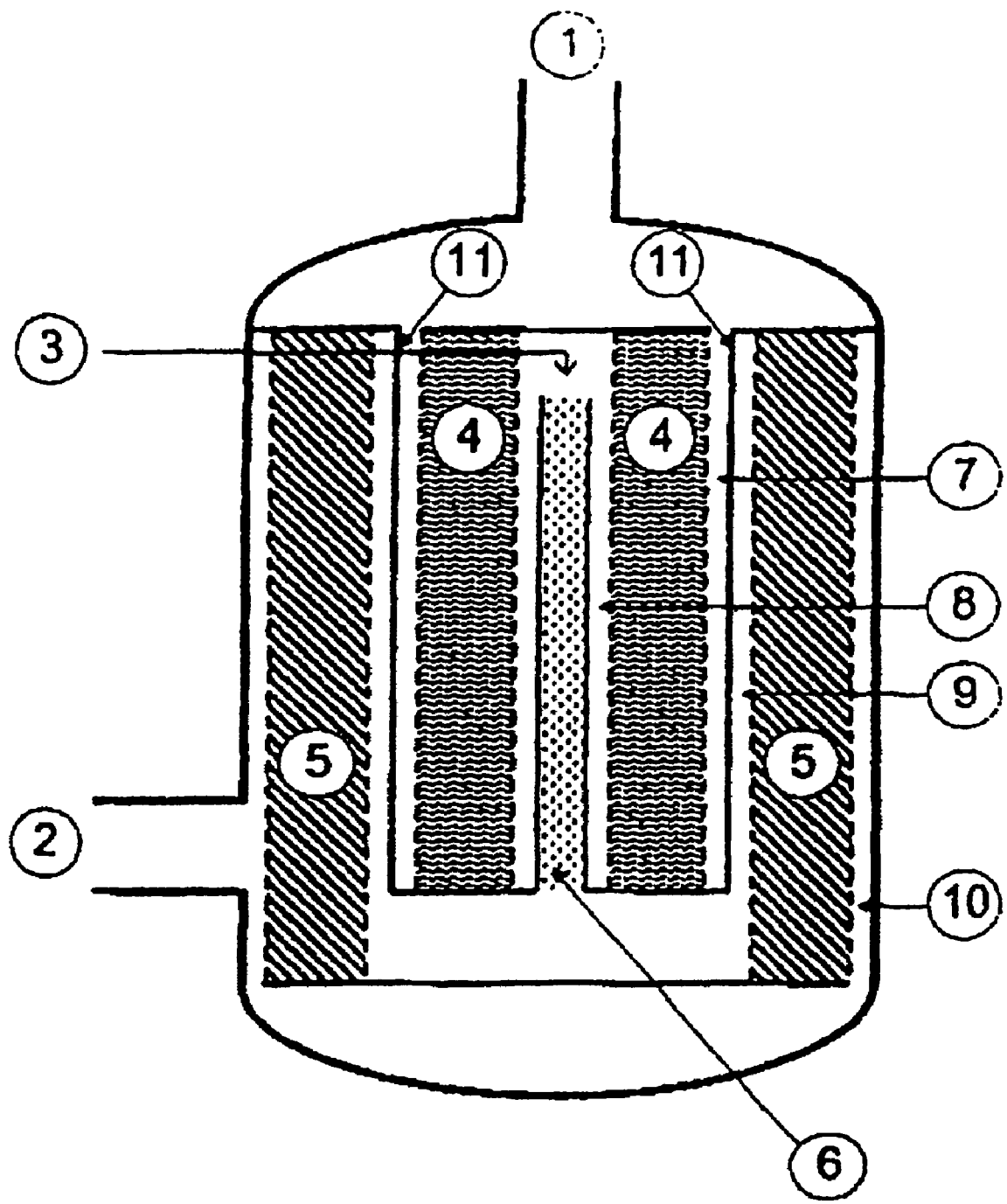
FIG. 4 depicts an apparatus with gas inlet (1) and gas inlet (2) and with the first catalyst bed (4) forming an inner hollow cylinder and the second catalyst bed (5) forming an outer hollow cylinder.

FIG. 4 shows a similar embodiment as FIG. 3 with the difference that the first catalyst bed (4) forms the inner hollow cylinder and the second catalyst bed (5) forms the outer hollow cylinder. The other reference numerals have the meanings given in the description of FIG. 3.

Figure 5:
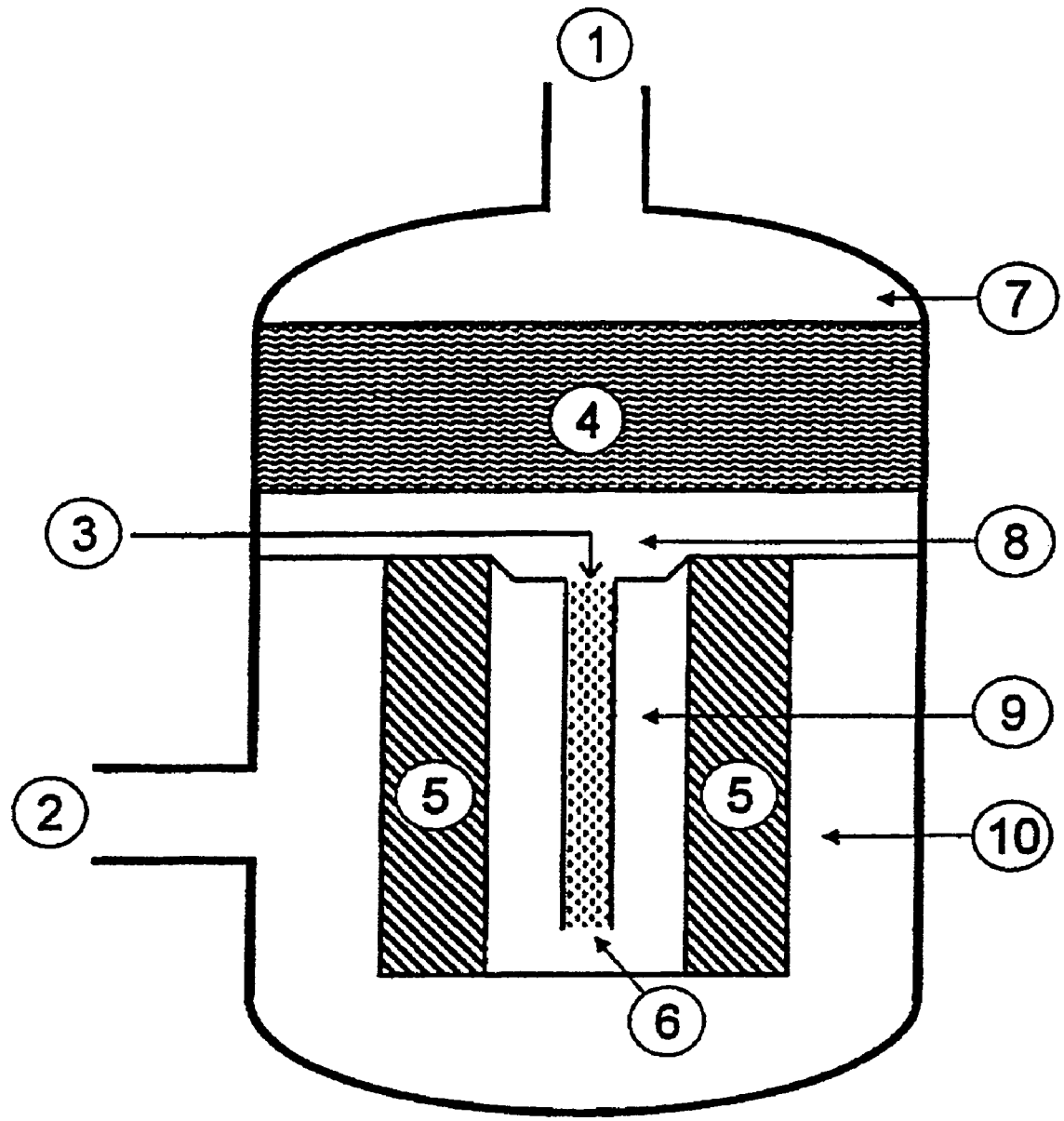
FIG. 5 depicts an apparatus with gas inlet (1) and gas outlet (2) where the gas flows via the gas inlet (1) axially through the first catalyst bed (4).

FIG. 5 shows an embodiment in which one catalyst bed through which the gas flows axially and one catalyst bed through which the gas flows radially are provided. The gas flows via the gas inlet (1) axially through the first catalyst bed (4) and into the mixer (6). The apparatus has a dividing wall which divides the interior of the apparatus into two halves. At the inlet end of the mixer (6) there is the opening of an inlet line (3) for the reducing agent. From the mixer (6) the gas flows into the annular gap of the entrance (9) to the second catalyst bed (5) and radially through this into the annular gap of the exit (10). From there the purified gas leaves the apparatus via the gas outlet (2).

Figure 6:
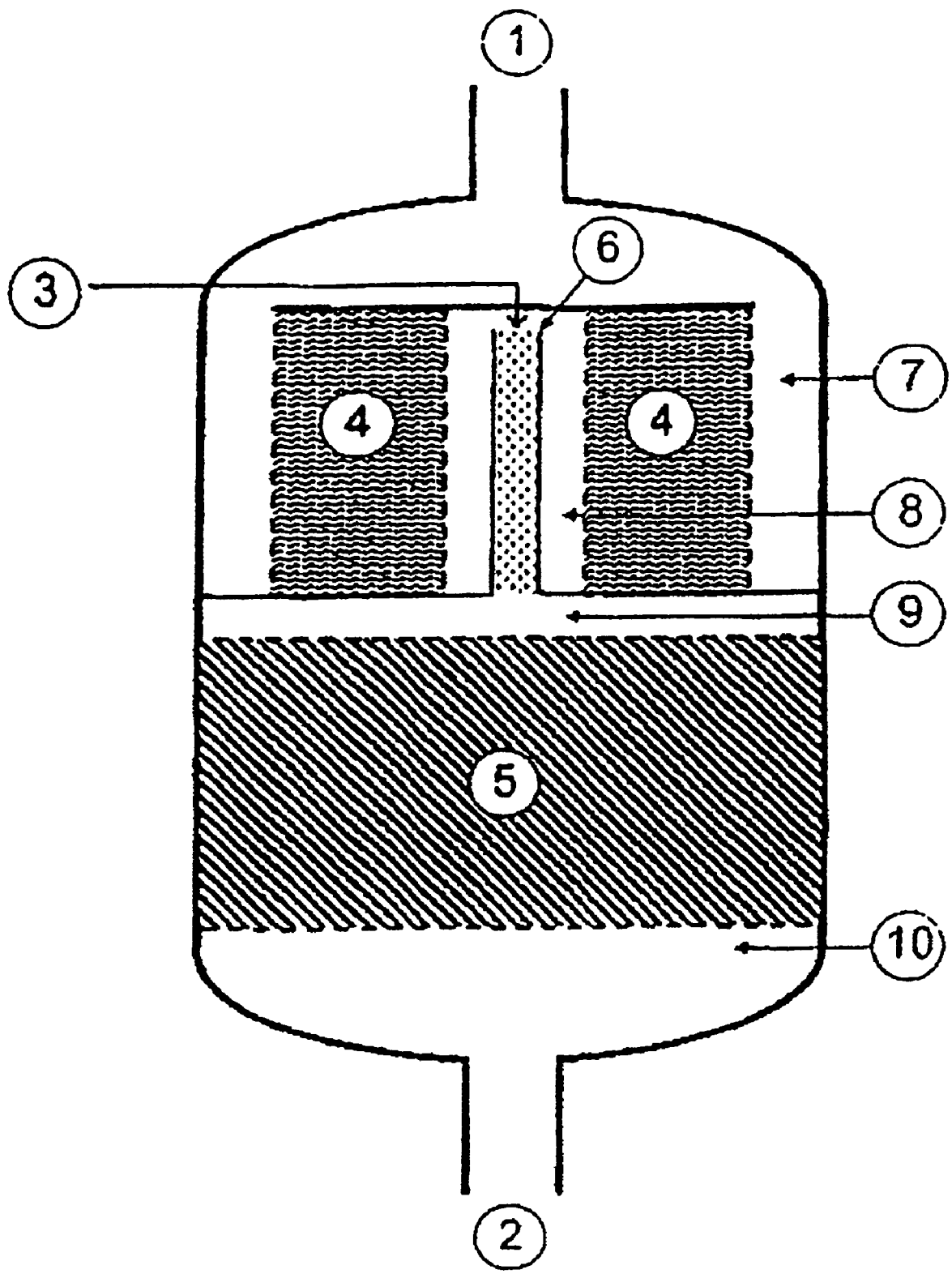
FIG. 6 depicts an apparatus with gas inlet (1) and gas outlet (2) where the gas flows radially through the first catalyst bed (4) and axially through the second catalyst bed (5).

FIG. 6 shows a similar embodiment as FIG. 5 with the difference that the gas flows radially through the first catalyst bed (4) and axially through the second catalyst bed (5). The other reference numerals have the meanings given in the description of FIG. 3.

The process of the invention is illustrated by the following example.

The catalyst used was an iron-laden zeolite of the ZSM-5 type. The Fe-ZSM-5 catalyst was prepared by solid-state ion exchange starting from a commercially available zeolite in ammonium form (ALSI-PENTA, SM27) Details regarding the preparation can be taken from: M. Rauscher, K. Kesore, R. Mönnig, W. Schwieger, A. Tißler, T. Turek: "Preparation of highly active Fe-ZSM-5 catalyst through solid state ion exchange for the catalytic decomposition of $N_2O$" in Appl. Catal. 184 (1999) 249-256.

The catalyst powders were calcined in air at 823 K for 6 hours, washed and dried overnight at 383 K. After addition of appropriate binders, the powders were extruded to form cylindrical catalyst bodies.

As apparatus for reducing the $NO_x$ and $N_2O$ content, use was made of two tube reactors which were connected in series and were each charged with such an amount of the above catalyst that a space velocity of 15,000 $h^{-1}$ based on the inflowing gas stream resulted in each case. $NH_3$ gas was added between the two reaction zones. The operating temperature of the reaction zones was set by means of heating. The analysis of the gas streams entering and leaving the reactors was carried out by means of an FTIR gas analyzer.

At inlet concentrations of 1,500 ppm of $N_2O$, 350 ppm of $NO_x$, 3,000 ppm of $H_2O$ and 1.2% by volume of $O_2$ and $N_2$ and with intermediate addition of $NH_3$ at a uniform operating temperature of 425° C. and an operating pressure of 6.5 bar, the conversion results for $N_2O$, $NO_x$ and $NH_3$ listed in the following table were obtained.

TABLE

| | Inlet concentration | Outlet concentration | Conversion |
|---|---|---|---|
| $N_2O$ | 1,500 ppm (reactor 1) | 540 ppm (reactor 1) | 64% |
| $NO_x$ (x = 1 – 2) | 360 ppm (reactor 2) | 80 ppm (reactor 2 | 78% |
| $NH_3$ | 310 ppm*) (reactor 2) | 0 ppm (reactor 2) | 100% |
| $N_2O$ | 540 ppm (reactor 2) | 190 ppm (reactor 2) | 65% |

*)added between the first reactor and the second reactor

The invention claimed is:

1. A process for reducing the content of $NO_x$ and $N_2O$ in gases comprising
   a) passing the $N_2O$- and $NO_x$-containing gas over a sequence of two catalyst beds comprising one or more iron-laden zeolites,
   b) adding a reducing agent for $NO_x$ between the catalyst beds,
   c) setting a temperature of less than 500° C. in the first catalyst bed and second catalyst bed,
   d) setting a gas pressure of at least 2 bar in the two catalyst beds,
   e) selecting a space velocity in the first and second catalyst beds such that a reduction in the $N_2O$ content of the gas by not more than 90%, based on the $N_2O$ content at the entrance to the first catalyst bed, occurs in the first catalyst bed and an $N_2O$ content of greater than 200 ppm is established and that a further reduction in the $N_2O$ content of the gas by at least 30%, based on the $N_2O$ content at the entrance to the second catalyst bed, occurs in the second catalyst bed.

2. The process as claimed in claim 1, characterized in that the same catalyst is used in the first and second catalyst beds.

3. The process as claimed in claim 1, characterized in that the iron-laden zeolite or zeolites is/are of the MFI, BEA, FER, MOR, FAU and/or MEL type.

4. The process as claimed in claim 3, characterized in that the iron-laden zeolite is of the MFI type.

5. The process as claimed in claim 1, characterized in that the zeolite is an Fe-ZSM-5.

6. The process as claimed in claim 1, characterized in that the process is carried out at a pressure in the range from 4 to 25 bar.

7. The process as claimed in claim 1, characterized in that ammonia is used as reducing agent for $NO_x$ and is employed in an amount of from 1.0 to 1.2 mol per mol of $NO_x$ to be removed.

8. The process as claimed in claim 1, characterized in that the $NO_x$- and $N_2O$-containing gas is passed over each of the catalyst beds at a space velocity of from 5,000 to 50,000 $h^{-1}$, based on the total catalyst volume of the two catalyst beds.

9. The process as claimed in claim 1, characterized in that the temperature in the first and second reaction zones is from 350 to 450° C.

10. The process as claimed in claim 1, characterized in that iron-laden zeolites which have been treated with water vapor are used in at least one catalyst bed.

11. The process as claimed in claim 1, characterized in that iron-laden zeolites in which the ratio of extralattice aluminum to lattice aluminum is at least 0.5 are used as catalysts in at least one catalyst bed.

12. The process as claimed in claim 1, characterized in that it is integrated into the process for nitric acid production.

13. The process as claimed in claim 1, characterized in that it is integrated into the process of operation of a gas turbine.

14. The process as claimed in claim 1, characterized in that it is integrated into the process of operation of a power station.

15. An apparatus for reducing the content of $NO_x$ and $N_2O$ in gases comprising
   A) two catalyst beds which are connected in series and each comprise one or more iron-laden zeolites and through which the $NO_x$- and $N_2O$-containing gas flows,
   B) a device for introducing a gaseous reducing agent into the stream of the $NO_x$- and $N_2$-containing gas located between the catalyst beds, which comprises a mixer through which the gas which has flowed through the first catalyst bed is passed and a feed line for reducing agent which opens into the space downstream of the first catalyst bed and before or into the mixer, with the gas to be purified being passed through the second catalyst bed after leaving the mixer, wherein
   C) at least one of the catalyst beds is configured as a hollow cylinder through which the $NO_x$- and $N_2O$-containing gas flows radially.

16. The apparatus as claimed in claim 15, characterized in that both catalyst beds are arranged in one container.

17. The apparatus as claimed in claim 15, characterized in that the $NO_x$- and $N_2O$-containing gas flows radially through both catalyst beds.

18. The apparatus as claimed in claim 15, characterized in that two catalyst beds through which the gas flows radially are arranged above one another or in that a combination of catalyst beds through which the gas flows axially and radially and which are arranged above one another is present, with the path of the gas being prescribed by suitably arranged separators between the catalyst beds so that the gas flows firstly through the first catalyst bed and then through the second catalyst bed.

19. The apparatus as claimed in claim 15, characterized in that two catalyst beds through which the gas flows radially and which have different dimensions are present, with the external dimension of one catalyst bed being smaller than the internal dimension of the other catalyst bed and both catalyst beds being arranged concentrically, and with the path of the gas being prescribed by suitably arranged separators between the catalyst beds so that the gas flows firstly through the first catalyst bed and then through the second catalyst bed.

20. The apparatus as claimed in claim 15, characterized in that the gas which has passed through the first catalyst bed is passed into a mixer located in the center of the apparatus.

21. The apparatus as claimed in claim 15, characterized in that the mixer is configured as a static mixer or as a dynamic mixer.

22. A process for reducing the content of $NO_x$ and $N_2O$ in gases, which comprises the measures:
   a) passing the $N_2O$- and $NO_x$-containing gas over a sequence of two catalyst beds comprising one or more iron-laden zeolites,
   b) adding a reducing agent for $NO_x$ between the catalyst beds,
   c) setting a temperature of less than 500° C. in the first catalyst bed and second catalyst bed,
   d) setting a gas pressure of at least 2 bar in the two catalyst beds,
   e) selecting a space velocity in the first and second catalyst beds such that a reduction in the $N_2O$ content of the gas by not more than 90%, based on the $N_2O$ content at the entrance to the first catalyst bed, occurs in the first catalyst bed and an $N_2O$ content of greater than 200 ppm is established and that a further reduction in the $N_2O$ content of the gas by at least 30%, based on the $N_2O$ content at the entrance to the second catalyst bed, occurs in the second catalyst bed wherein at least one catalyst bed is configured as a hollow cylinder through which the $NO_x$ and $N_2O$ containing gas flows radially.

* * * * *